United States Patent [19]

Akiyama et al.

[11] Patent Number: 5,281,709
[45] Date of Patent: Jan. 25, 1994

[54] PRODUCTION OF AN AZINE DYE HAVING EXCELLENT HEAT- AND LIGHT-RESISTANCE

[75] Inventors: Kazutoshi Akiyama, Matsubara; Sadahiko Matsubara, Neyagawa, both of Japan

[73] Assignee: Orient Chemical Industries, Ltd., Osaka, Japan

[21] Appl. No.: 730,051

[22] Filed: Jul. 15, 1991

[30] Foreign Application Priority Data

Jul. 31, 1990 [JP] Japan ................... 2-205679

[51] Int. Cl.$^5$ ................. C07D 241/46; C09B 17/02
[52] U.S. Cl. ........................ 544/348; 544/347
[58] Field of Search ............................ 544/348

[56] References Cited

U.S. PATENT DOCUMENTS

| | | | |
|---|---|---|---|
| 1,896,244 | 2/1933 | Merz | 544/348 |
| 2,045,069 | 6/1936 | Conzetti | 544/348 |
| 2,058,666 | 10/1936 | Conzetti | 544/348 |
| 2,328,759 | 9/1943 | Wahl | 544/348 |
| 4,359,577 | 11/1982 | Granzon | 544/348 |
| 4,376,859 | 3/1993 | Maurer | 544/348 |
| 4,383,859 | 5/1983 | Moore | 106/22 |
| 4,624,709 | 11/1986 | Otsaka | 544/348 |
| 4,775,754 | 10/1988 | Vogel et al. | 544/348 |
| 4,927,538 | 5/1990 | Senshu | 534/887 |

FOREIGN PATENT DOCUMENTS 0340792 5/1989 European Pat. Off. .

OTHER PUBLICATIONS

Finkenauer, Chem. Abs. 66, 3824K(1966).
Rao, J. Indian Chem. Soc. 62, 172-3 (1985).
Derwent Abstract 77-83478Y "Acid Alkali Amine Aromatic Azine Condensation Dye...", (1977).
Derwent Abstract 77-91266Y "Alkali Aqueous Dye Extract...", (1977).
Translation of DE 3,615571 (1987).
Translation of DE 86,109 (1896).
Translation of DE 90,212 (1896).

*Primary Examiner*—Mark L. Berch
*Attorney, Agent, or Firm*—Birch, Stewart, Kolasch & Birch

[57] ABSTRACT

Disclosed is the process for the preparation of dye having excellent heat- and light-resistance. The dye can preferably be employed as a colorant for heat-resistant resin materials such as polyamide, as a colorant and a charge control agent for an electrostatic image developing toner (i.e. positively chargeable toner), and as a colorant for writing ink composition having a good aging stability. The process of the present invention comprising (a) mixing crude azine dye, produced by condensation of anilines or aniline hydrochlorides with nitrobenzenes in the presence of catalysts, with organic solvents; and (b) extracting by-products from the crude azine dye mixture.

21 Claims, 9 Drawing Sheets

The conventional nigrosine dye (Nigrosine Base EX)

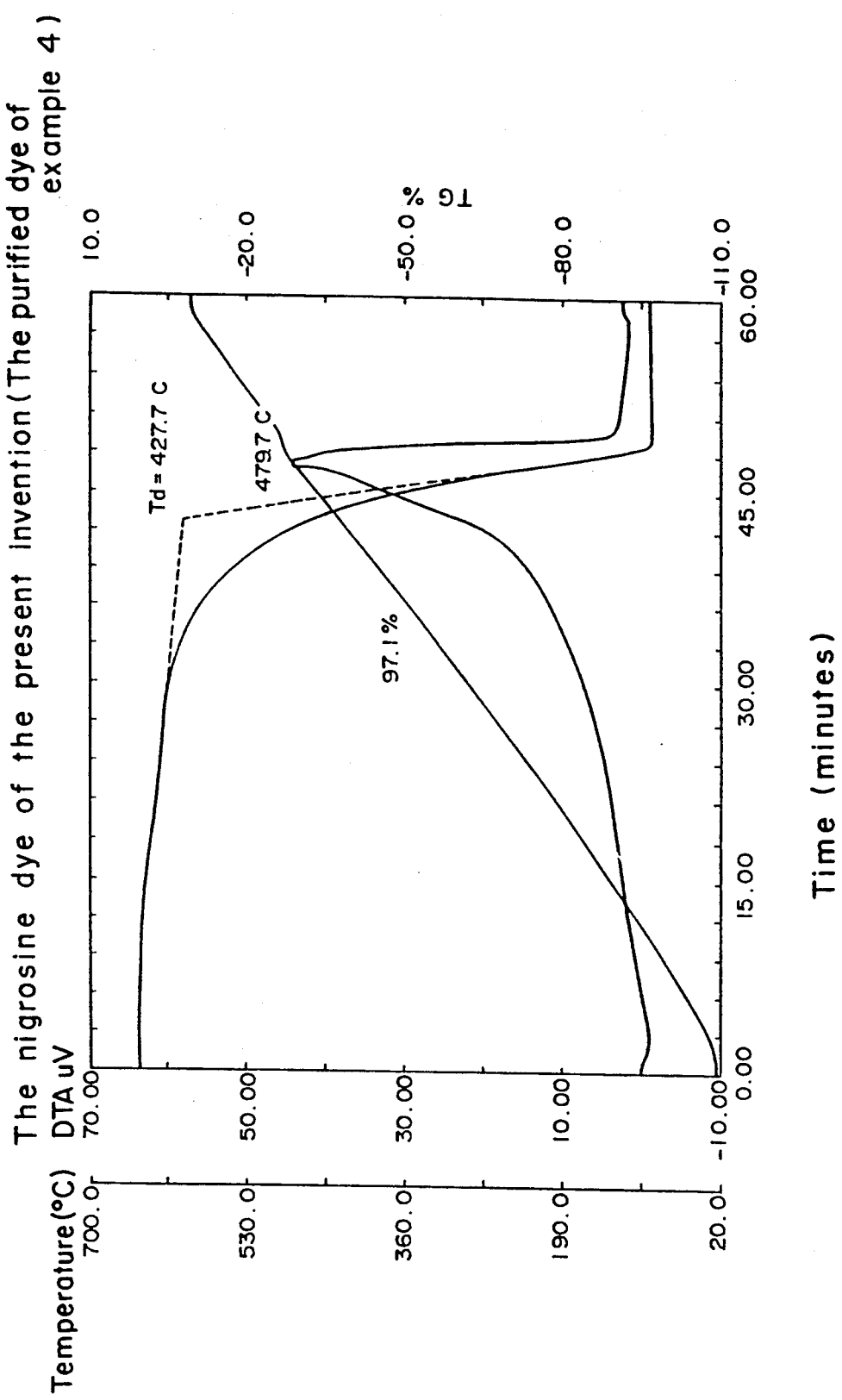

PRODUCTION OF AN AZINE DYE HAVING EXCELLENT HEAT- AND LIGHT-RESISTANCE

FIELD OF THE INVENTION

The present invention relates to a process for the preparation of an azine dye having excellent heat- and light-resistance. More particularly, the present invention relates to a process for the preparation of the azine dye, which comprises eliminating by-products from the azine dye, such as C. I. Solvent Black 5 and C. I. Solvent Black 7 by the use of organic solvents.

BACKGROUND OF THE INVENTION

A nigrosine dye such as C. I. Solvent Black 5 and C. I. Solvent Black 7 is an azine dye which is usually produced by condensation of aniline hydrochlorides with nitrobenzenes in the presence of catalysts such as iron chlorides.

The nigrosine dye is a mixture which comprises a number of azine compounds and by-products. The major components of the crude azine dye are blue-black dyes or purple-black dyes having a framework of phenazine, phenazineazine, triphenazineoxazine and the like.

Thus, the conventional nigrosine dye comprises the wide variety of colored or colorless by-products other than the major components. These by-products are responsible for the degradation in color strength, heat-resistance and light-resistance of the nigrosine dye, which impart detrimental effects on performance qualities. (i.e. the initial color strength, the aging stability, the fastness properties, the safety properties and the like) when used for many applications (e.g. a colorant of synthetic resin, a printing ink, a writing ink, a recording solution and a charge control agent). However, it has been believed that these by-products are the indispensable components for the color shade and other properties of the nigrosine dye.

SUMMARY OF THE INVENTION

An object of the present invention is to provide the process for the preparation of the azine dye having excellent heat- and light-resistance. The process of the present invention, accordingly, eliminates the by-products from the crude azine dye easily and effectively. It has been considered that these by-products are unable to be eliminated by the conventional physical purification means such as supercentrifugation or precision filtration. The process of the present invention comprises (a) mixing crude azine dye, produced by condensation of anilines or aniline hydrochlorides with nitrobenzenes in the presence of catalysts, with organic solvents; and (b) extracting by-products from the crude azine dye mixture.

Another object of the present invention is to provide the dye having excellent heat-resistance and light-resistance which can preferably be employed as a colorant for heat-resistant resin materials such as polyamide, as a colorant and a charge control agent for an electrostatic image developing toner (i.e. positively chargeable toner), and as a colorant for writing ink composition having a good aging stability. The dye, accordingly, is the nigrosine dye having broad color shade between 400 nm and 700 nm, and having relatively higher molecular weight and aging stability due to the lack of the by-products ranging in the lower molecular side. Similar to the conventional nigrosine dye, the mutagenic property of the dye according to the present invention is proved to be negative by Ames test. The dye is produced by the abovenoted process of the present invention.

BRIEF DESCRIPTION OF THE DRAWINGS

FIG. 9 indicates the result in differential thermal analysis of the purified nigrosine dye according to the present invention.

DETAILED DESCRIPTION OF THE INVENTION

Figure 1:
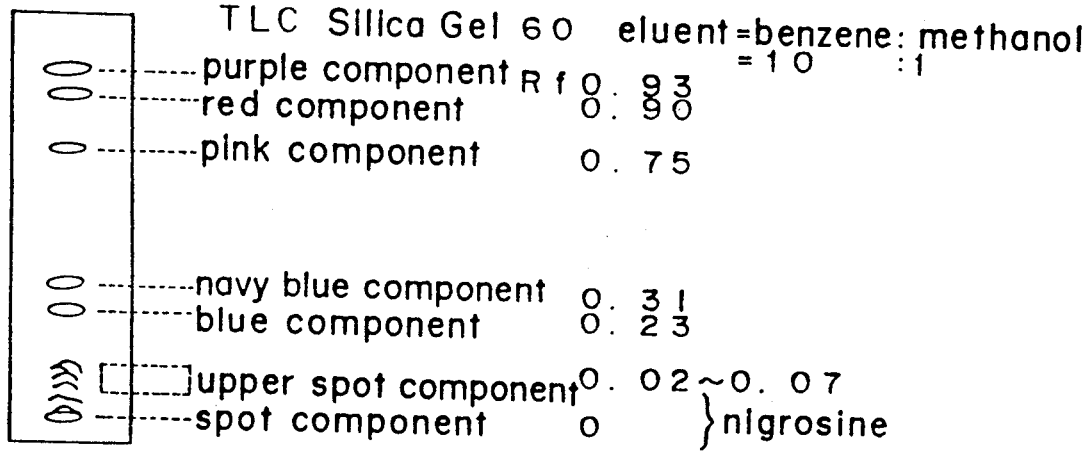
FIG. 1 indicates the Rf values of nigrosine and by-products, as well as color shades thereof.

The crude azine dyes which can be used in the present invention as starting materials can be Nigrosine Spirit Soluble corresponding to C. I. Solvent Black 5 (e.g. Orient Spirit Black AB and SA); and Nigrosine Base corresponding to C. I. Solvent Black 7 (e.g. Orient Nigrosine Base EE and EX, Phenol Black LN (Bayer AG) and Nigrosine Base BA (Bayer AG)).

Usually, the nigrosine is prepared by the condensation of the aniline hydrochlorides with the nitro compounds. The aniline hydrochlorides can have alkyl substituted nucleus. The nitro compounds can be alkyl substituted nitrobenzenes, nitrophenols or nitrocresols.

The resulting nigrosine condensation product may directly be employed in the present invention. Alternatively, a proper amount of anilines may be recovered from the product prior to use. Inorganic compounds may also be eliminated from the product prior to use by alkaline treatment, by washing with water, or by the other means such as described in Japanese Kokoku Publication 29901/1981. Nigrosine hydrochlorides such as C. I. Solvent Black 5 may preferably be used in the present invention. However, the nigrosine condensation product as abovementioned is more preferred.

The organic solvent employed in the present invention can be aromatic solvents (e.g. benzene, toluene, xylene, chlorotoluene, o-dichlorobenzene, cresol); petrolic solvents (e.g. aliphatic or alicyclic hydrocarbon solvents such as n-hexane, n-heptane, 2-methyl pentane, n-octane, iso-octane, n-nonane, n-decane, cyclohexane and methyl cyclohexane); alcohols (e.g. propanol, butanol, pentanol and amyl alcohol); Cellosolves (e.g. ethylene glycol monomethyl ether, ethylene glycol monoethyl ether and propylene glycol monomethyl ether); ketones (e.g. methyl ethyl ketone, diethyl ketone and methyl isobutyl ketone); esters (e.g. ethyl acetate, propyl acetate and butyl acetate); and the other solvents such as dioxane and butyl ether. The preferred organic solvents are xylene, dichlorobenzene, n-hexane, methyl ethyl ketone, ethyl acetate and the like. The organic solvent can be used alone or in combination. The solvents substantially unable to dissolve the purified azine dye of the present invention are preferred.

The amount of the organic solvents employed in the present invention can vary dependent upon the type of the starting dye materials. If the starting material is the powdered nigrosine, 5-10 folds by weight of the organic solvents based on the weight of the powdered nigrosine is preferred. If the starting material is the nigrosine condensation product containing excess anilines and the like, 2-5 folds by weight of the organic solvents based on the weight of the condensation products is preferred.

The process of the present invention comprises mixing, or mixing and heating the conventional crude azine dye with the organic solvents. Since the major components abovementioned of the azine dye are substantially insoluble into the organic solvents, the resulting mixture is maintained in the solid/liquid separated phase. Then, the major components and the organic solvents containing the by-products can easily be separated by the conventional separation means such as filtration and centrifugation. A Soxhlet's extractor may also be used in the present invention. The resulting purified dye comprises the major components (unextracted residue) not less than 85% by weight, preferably not less than 90% by weight.

According to the present invention, most of the by-products contained in the conventional crude azine dye are extracted. More than 20 kinds of the by-products are selectively extracted and removed. It is believed that the by-products are color or substantially colorless components which are contained in the dye in a very small amount. The total amount of these by-products is about 25% by weight based on the weight of the conventional nigrosine dye. Many of these by-products are susceptible to decomposition or alternation due to heating or oxidation.

The by-products eliminated from the crude azine dye according to the present invention has 0.1-1.0 of Rf value in thin layer chromatographic analysis. The Rf value is given in the chromatographing by the use of Silica Gel 60, F254, 20×20 cm, 0.25 mm thick (Merck & Co., Inc.) as adsorbent, and 10/1 weight ratio of benzene/methanol solution as eluent. The Rf values of the nigrosine and the by-products, as well as color shades thereof are indicated in FIG. 1.

In the present invention, the difference of the solubility into the organic solvents between the major components and the by-products is taken advantage. The by-products extracted effectively according to the present invention generally have 0.5-0.9 of Rf value. However, the effective Rf value can vary dependent upon the organic solvent utilized as eluent.

The efficiency of the by-products elimination depends on the pH of the dye utilized as the starting material, or on the post-treatment of the condensation product. When the condensation products of the nigrosine hydrochlorides are utilized as the starting material, it is possible to obtain an increased efficiency in elimination of the by-products. The non-polar organic solvents such as xylene, dichlorobenzene and n-hexane can preferably be employed in this instance.

On the other hand, when the nigrosine dyes or the nigrosine condensation products containing the nigrosine dyes are the alkali treated Nigrosine Base (e.g. C. I. Solvent Black 7), it is preferred that the polar organic solvents such as alcohols and ketones are employed. If the non-polar organic solvents are utilized in this instance, the loss of the major components may increase.

However, when the Soxhlet's extraction is utilized, the both polar and non-polar organic solvents can be employed provided that the azine dyes must not agglomerate in the selected organic solvents under heating condition. In this instance, more than one extraction processes may be carried out to improve the purity of the resulting dye.

EXAMPLES

The present invention will be more specifically described by the following non-limiting examples, wherein all parts are by weight unless otherwise specified.

EXAMPLE 1

Into a Soxhlet's extractor were added 50.8 parts of Spirit Black SA (Orient Chemical Industries Ltd.). The Soxhlet's extraction was then carried out over 48 hours using 1000 parts of benzene as the solvent. The resulting residue was dried at 80° C. under reduced pressure to provide 37.9 parts of purified nigrosine compound.

The starting material Spirit Black SA, the resulting residue and the extract (in benzene) were analyzed by elemental analysis, visible light absorption spectroscopy and gel permeation chromatography. Heat-resistance and light-resistance of the starting material Spirit Black SA and the resulting purified dye (the resulting residue) were then evaluated.

Elemental Analysis

Table 1 shows the results obtained by elemental analysis.

TABLE 1

| Sample | Carbon % | Hydrogen % | Nitrogen % |
|---|---|---|---|
| Spirit Black SA | 75.98 | 4.42 | 14.40 |
| residue | 73.13 | 4.22 | 14.19 |
| extract | 79.47 | 4.72 | 13.87 |

Visible Light Absorption Spectroscopy

Figure 2:
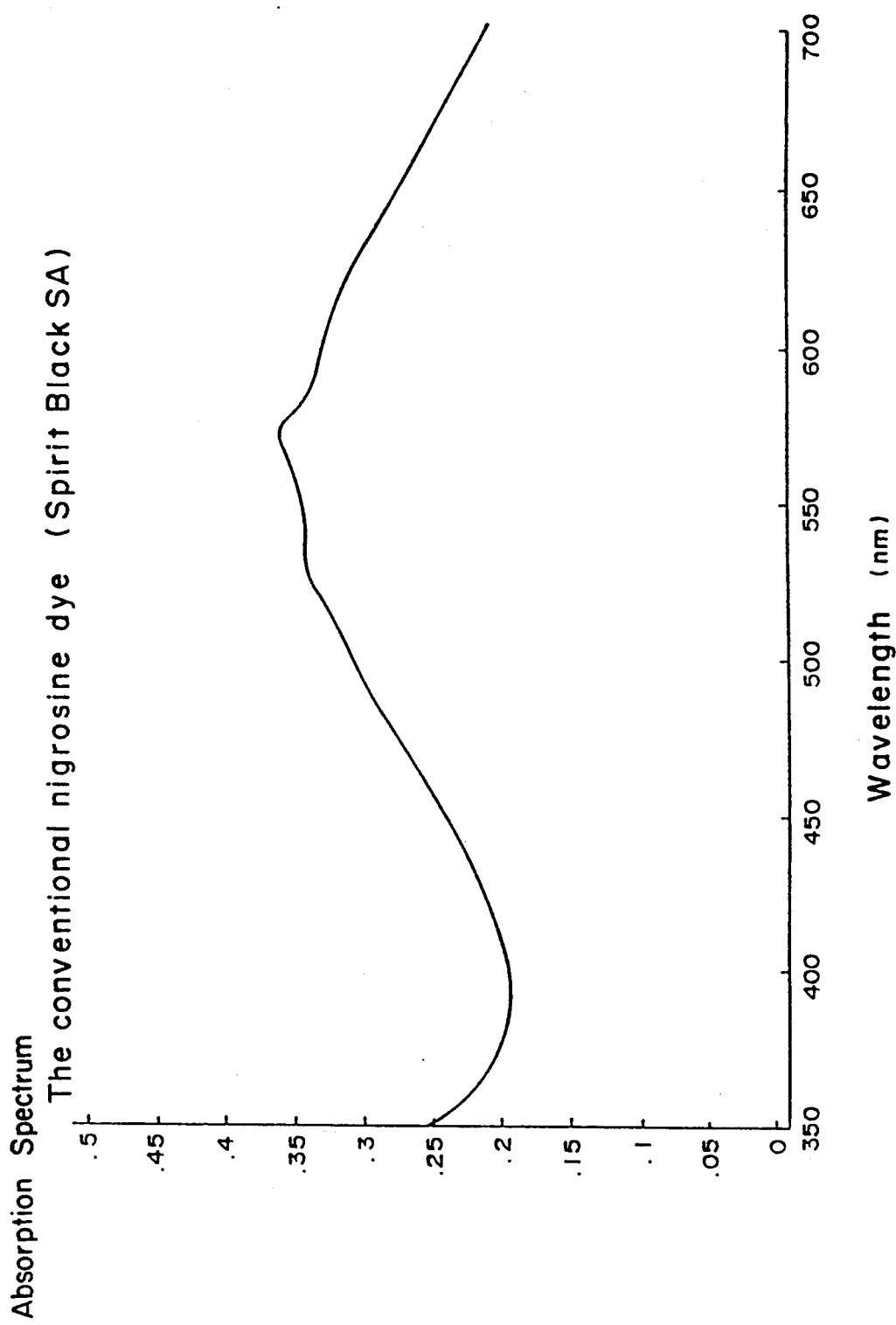
FIG. 2 is a visible light absorption spectrum of the starting material Spirit Black SA.
Figure 3:
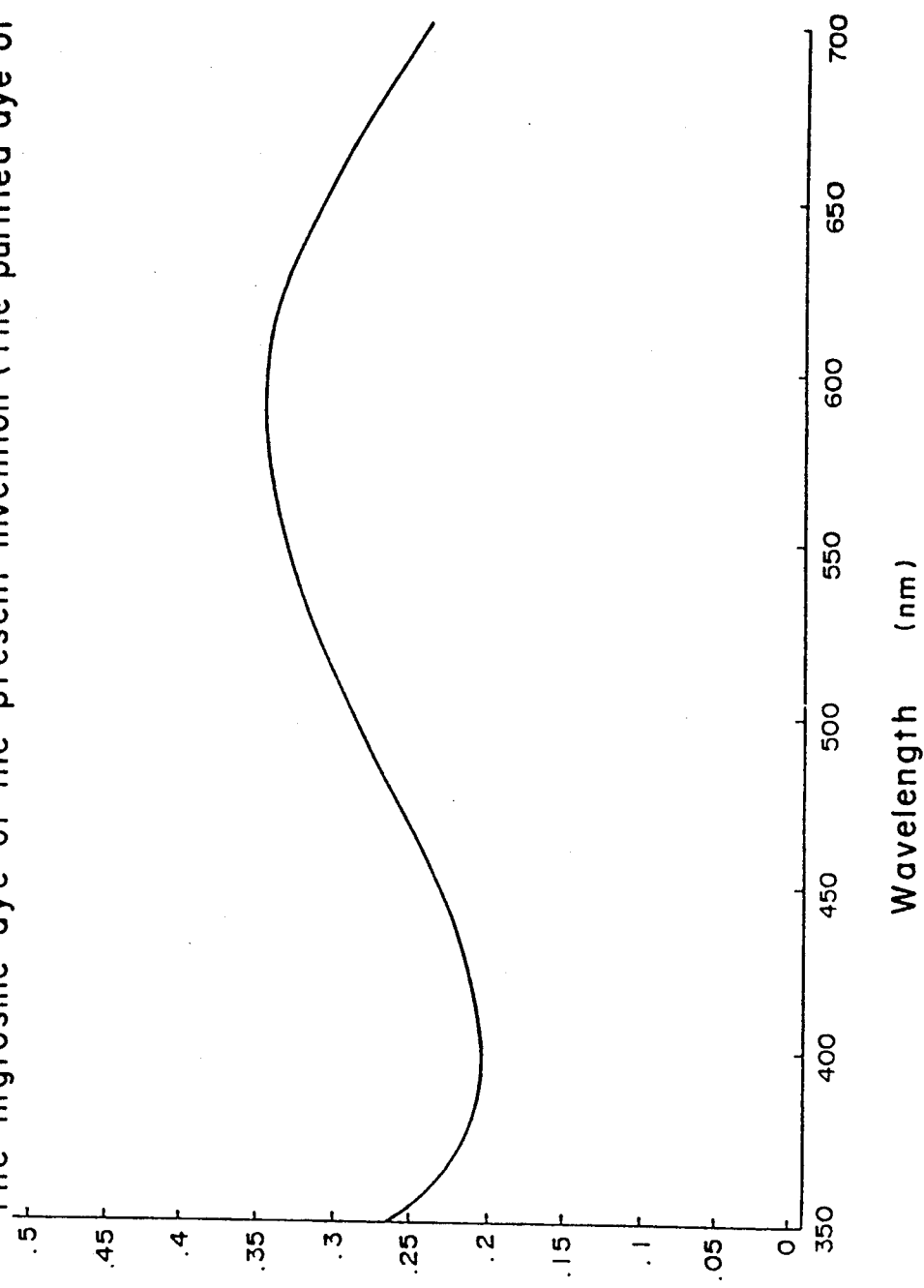
FIG. 3 is a visible light absorption spectrum of the purified dye of the present invention.
Figure 4:
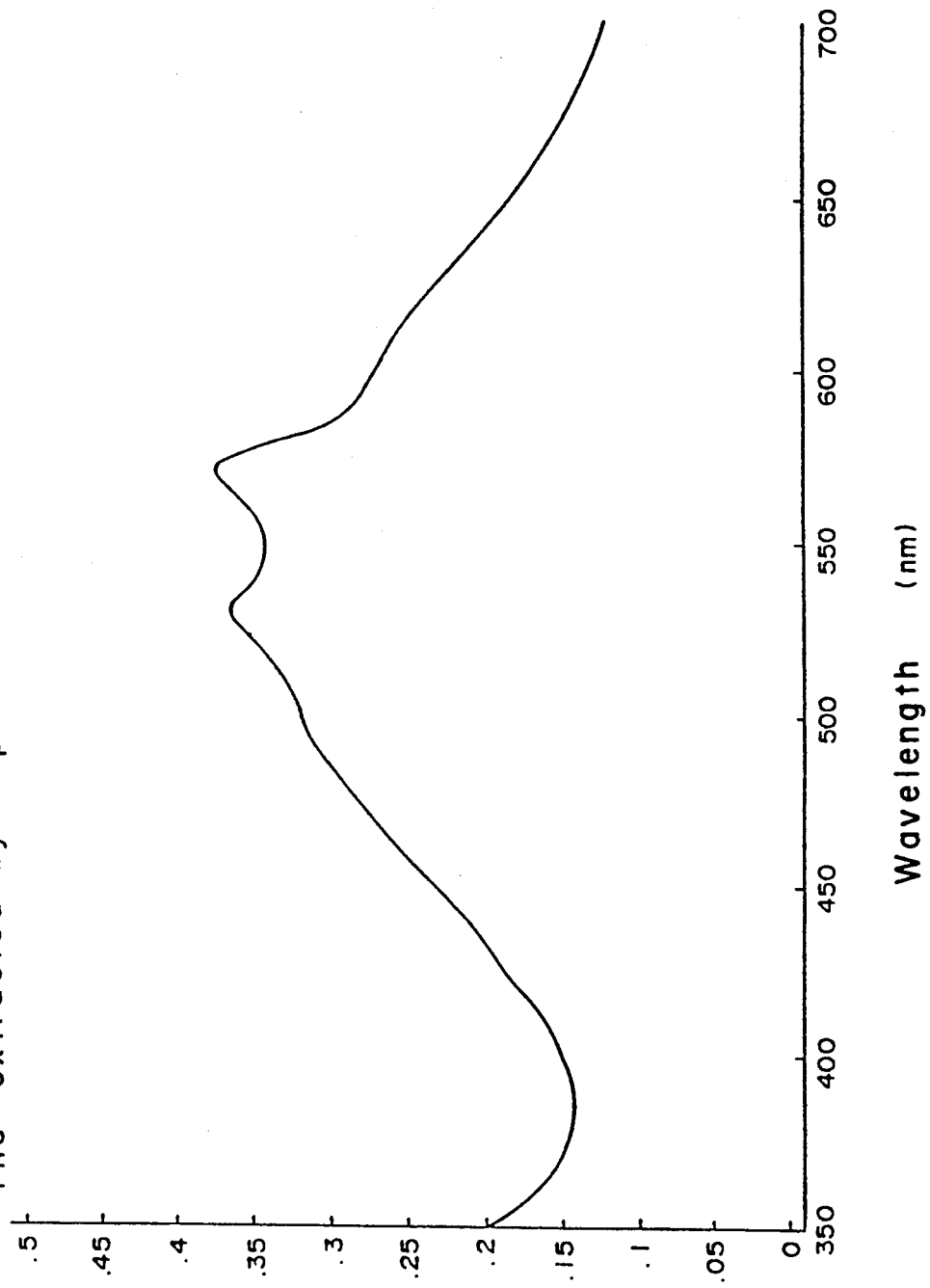
FIG. 4 is a visible light absorption spectrum of the byproducts extracted from the starting material Spirit Black SA.

The homogenous solutions of 0.01 parts of the samples into 100 parts of the toluene/ethanol (1/1 by weight) solvent were prepared. Ten ml of the solution were then dissolved into the toluene/ethanol solvent to obtain the 100 ml of the diluted solution samples. The solution samples were analyzed by visible light absorption spectroscopy using a UV-Visible spectrophotometer HP-8451A commercially available from Hewlett-Packard Co. FIG. 2-4 show visible light absorption spectra of the respective samples.

Gel Permeation Chromatography

The homogenous solutions of 0.03 parts of the samples into 10 parts of dimethylformamide were prepared. The solution samples were analyzed by gel permeation chromatography under the following condition.

| | |
|---|---|
| Column: | Shodex (Showa Denko K. K.) KD-803 + 802 × 2 |
| | Elimination limit molecular weight 5000 |
| | Number of theoretical plates 16000 |
| Eluent: | dimethylformamide (0.01 mol LiBr) |
| Flow: | 1 ml/min |

| | | |
|---|---|---|
| Detector: | UV-Visible spectrophotometer | |
| | SPD-6AV (SHIMADZU CORPORATION) | |
| | Wavelength 560 nm | |

Figure 5:
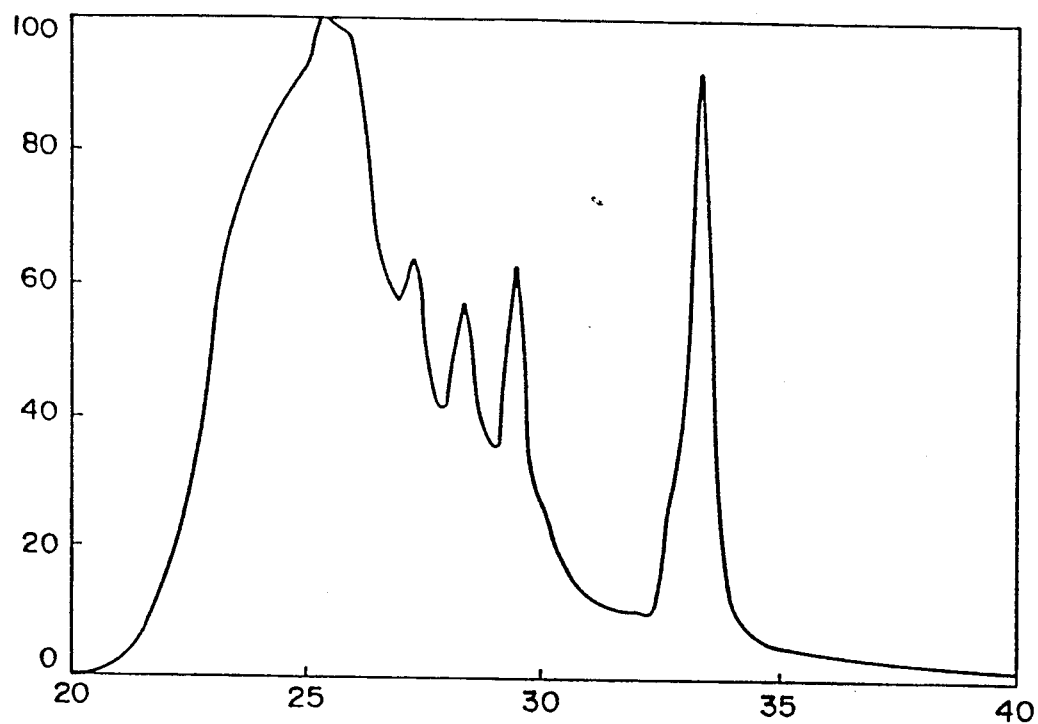
FIG. 5 is a elution curve of the starting material Spirit Black SA obtained by gel permeation chromatography.
Figure 6:
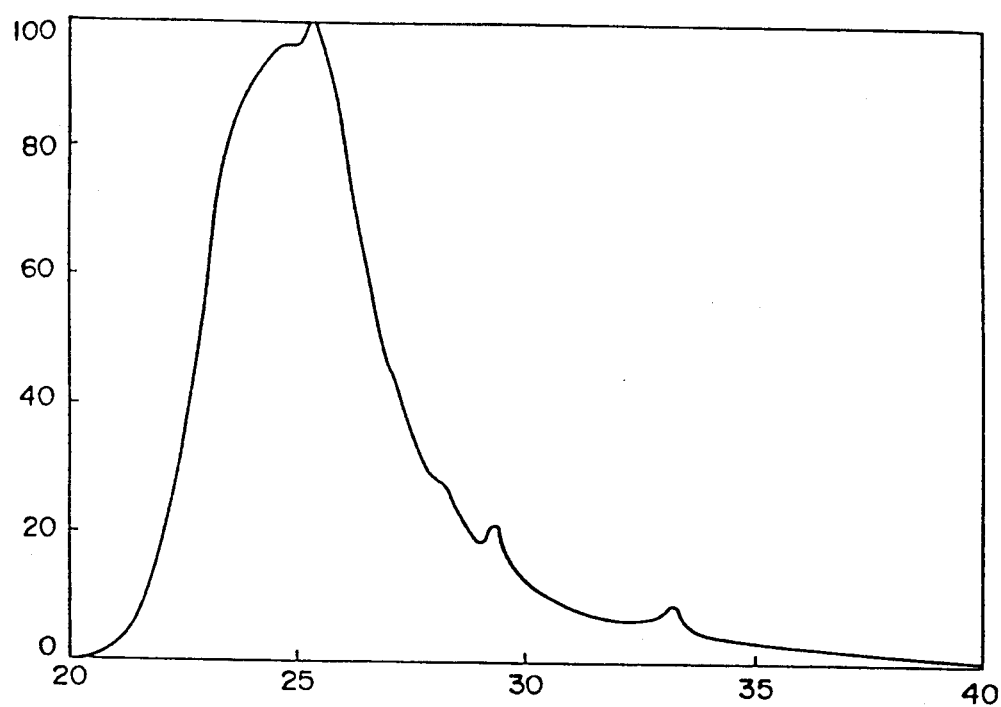
FIG. 6 is a elution curve of the purified dye of the present invention obtained by gel permeation chromatography.
Figure 7:
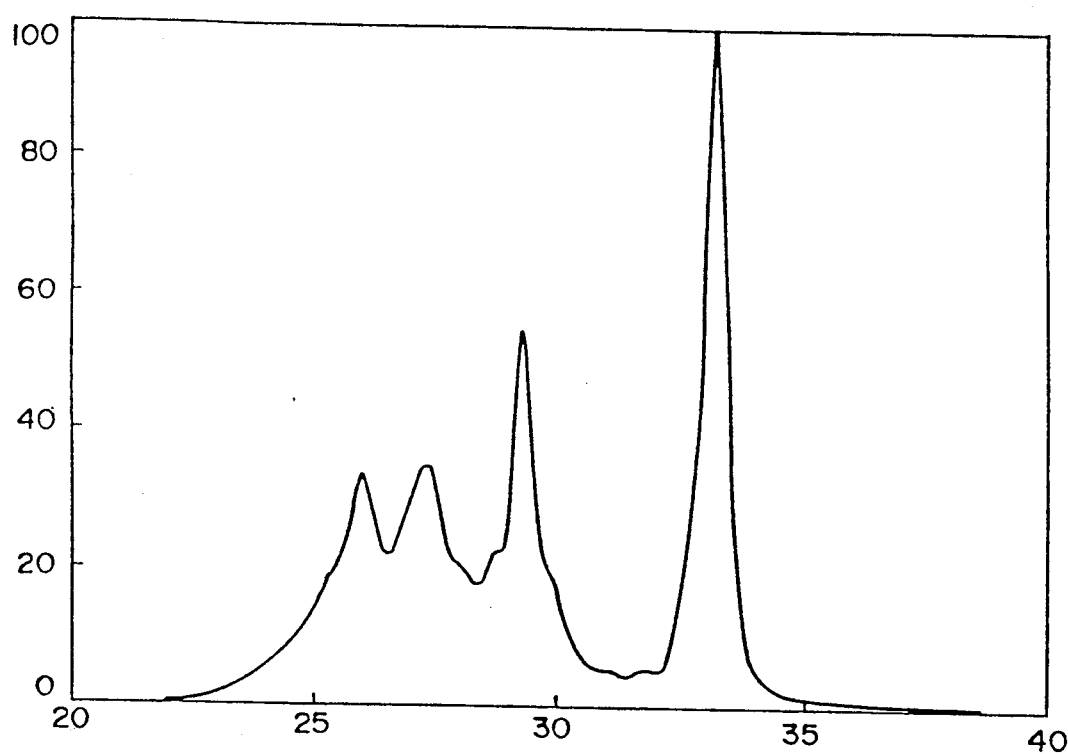
FIG. 7 is a elution curve of the by-products extracted from the starting material Spirit Black SA obtained by gel permeation chromatography.

FIG. 5-7 show elution curves of the respective samples obtained by gel permeation chromatography.

Heat-resistance

According to the conventional procedure, sample pellets were prepared from the molten mixture of 0.5 g of the starting material Spirit Black SA or 0.5 g of the purified nigrosine dye (the residue) with 500 g of nylon 6 at 285° C. respectively. The pellets were then formed to plates by an injection molder at 300° C. in 10 minutes holding. Heat-resistance of the resulting plates were evaluated by visual inspection of their color change. The results are shown in Table 2.

Light-resistance

According to the conventional procedure, said colored pellets were formed to sample plates at 240° C. The resulting plates were then irradiated for 20 hours by the use of carbon-arc fadeometer. Light-resistance of the plates were evaluated by visual inspection of their color change. The results are shown in Table 2.

TABLE 2

| | Spirit Black SA | Purified dye |
|---|---|---|
| Color change with time | observed brown → black | not observed black |
| Color intensity | low | high |
| Heat-resistance | low* | high |
| Light-resistance | low* | high |

*High degree of color change was observed.

EXAMPLE 2

Into a Soxhlet's extractor were added 50.9 parts of Spirit Black SA (Orient Chemical Industries Ltd.). Soxhlet's extraction were then carried out over 48 hours using 500 parts of isopropyl alcohol as the solvent. The resulting residue was dried at 80° C. under reduced pressure to provide 42.5 parts of purified nigrosine compound.

EXAMPLE 3

The well mixed solution of 57.0 parts of a nigrosine condensation product with 43.0 parts of aniline was prepared. Into the solution was added dropwise 250 parts of xylene over 1 hour while mixing was continued. The mixture was stirred for 3 hours, and then filtered. The resulting residue was dried at 80° C. under reduced pressure to provide 30.5 parts of a purified nigrosine compound.

EXAMPLE 4

The well mixed solution of 100.0 parts of Nigrosine Base EX (Orient Chemical Industries Ltd.) with 150 parts of aniline was prepared. Into the solution was added dropwise 600 parts of xylene over 1 hour while mixing was continued. The mixture was stirred for 3 hours at room temperature, and then filtered. The resulting residue was dried at 80° C. under reduced pressure to provide 63.5 parts of purified nigrosine compound.

Figure 8:
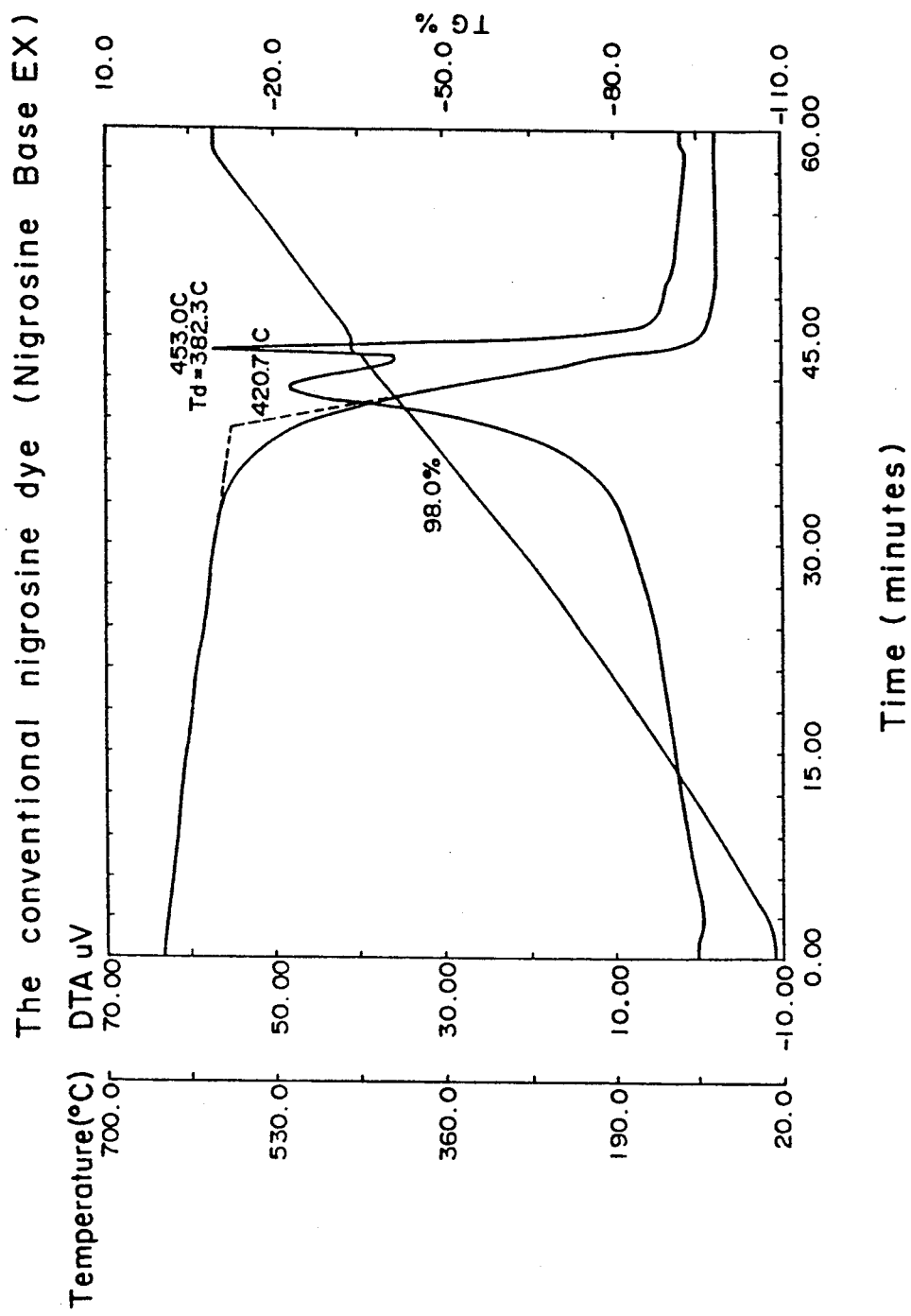
FIG. 8 indicates the result in differential thermal analysis of the conventional nigrosine dye Nigrosine Base EX.

The starting material Nigrosine Base EX and the purified nigrosine compound were analyzed by differential thermal analysis. First, 1.0 parts of each samples were weighed onto aluminum cups. The cups were then heated from 50° C. to 600° C. at the rate of 10° C./min under air feeding at 200 ml/min to obtain TG/DTA curves. As an analytic apparatus, TG/DTA 200 which is available from Seiko Instruments Inc. was used. The results are shown in FIG. 8 and FIG. 9. FIG. 8 and FIG. 9 indicate that the purified nigrosine dye according to the present invention has excellent heat-resistance.

EXAMPLE 5

The well mixed solution of 30.1 parts of Nigrosine Base EX (Orient Chemical Industries Ltd.) and 200.5 parts of methyl ethyl ketone were prepared. The mixture was stirred for 3 hours at room temperature, and then filtered under reduced pressure. The resulting residue was dried at 80° C. under reduced pressure to provide 21.4 parts of purified nigrosine compound.

EXAMPLE 6

The well mixed solution of 30.6 parts of Nigrosine Base EX (Orient Chemical Industries Ltd.) with 201.7 parts of ethyl acetate was prepared. The mixture was stirred for 3 hours at room temperature, and then filtered under reduced pressure. The resulting residue was dried at 80° C. under reduced pressure to provide 25.5 parts of purified nigrosine compound.

EXAMPLE 7

Spirit Black SA, Nigrosine Base EX and the purified nigrosine dyes of example 1-6 were determined in the major components content by the use of iatron scan TH-10 (Yatron Co.) First, 0.001 parts of said samples were dissolved into 1 parts of benzene/methanol (1/1 by weight) solvent. Three $\mu$l of the each solutions were spotted onto chromato-lods S III respectively. The chromato-lods were then developed using benzene/methanol (10/2 by weight) solvent, and dried. The dried chromato-lods were measured on the scanner. The results are shown in Table 3.

TABLE 3

| Samples | Major Components Content % |
|---|---|
| Spirit Black SA | 71.5 |
| Nigrosine Base EX | 77.3 |
| Example 1 | 93.7 |
| Example 2 | 85.8 |
| Example 3 | 88.2 |
| Example 4 | 91.3 |
| Example 5 | 86.5 |
| Example 6 | 85.2 |

What is claimed is:

1. A process for preparing a purified nigrosine dye having excellent heat- and light-resistance comprising:
    (a) mixing crude nigrosine dye, produced by condensation of anilines or aniline hydrochloride with nitrobenzenes in the presence of catalysts, with an organic solvent in which said purified nigrosine dye is insoluble; and
    (b) extracting by-products soluble in said organic solvent from the crude nigrosine dye mixture.

2. A process for preparing the azine dye according to claim 1, wherein the mixing is conducted with heating.

3. A process for preparing the azine dye according to claim 1, wherein the crude azine dye is selected from the group consisting of C. I. Solvent Black 5 and C. I. Solvent Black 7.

4. A process for preparing the azine dye according to claim 1, wherein the organic solvent is selected from the group consisting of aromatic hydrocarbons, aliphatic hydrocarbons, alicyclic hydrocarbons, alcohols, ketones and esters.

5. A process for preparing the azine dye according to claim 1, wherein the by-products being eliminated are components migrating with an Rf value of 0.1–1.0 in thin layer chromatography on 0.25 mm thick Silica Gel 60 F254 as the adsorbent when developed with a mixture of 10/1 weight/weight of benzene/methanol as eluent.

6. A process for enhancing the heat- and light-resistance of azine dye obtained by the condensation of anilines or hydrochlorides thereof with nitrobenzenes, comprising:
(a) mixing crude azine dye with an organic solvent in which the enhanced azine dye is insoluble; and
(b) extracting by-products soluble in said organic solvent from the crude azine dye mixture.

7. A process for enhancing the heat and light resistance of azine dye according to claim 6, wherein the mixing is conducted with heating.

8. A process for enhancing the heat and light resistance of azine dye according to claim 6, wherein the crude azine dye is selected from the group consisting of C.I. Solvent Black 5 and C.I. Solvent Black 7.

9. A process for enhancing the heat and light resistance of azine dye according to claim 6, wherein the organic solvent is selected from the group consisting of aromatic hydrocarbons, aliphatic hydrocarbons, alicyclic hydrocarbons, alcohols, ketones and esters.

10. A process for enhancing the heat and light resistance of azine dye according to claim 6, wherein the by-products being eliminated are components migrating with an Rf value of 0.1–1.0 in thin layer chromatography on 0.25 mm thick Silica Gel 60 F254 as the adsorbent when developed with a mixture of 10/1 weight/weight of benzene/methanol as eluent.

11. A process for preparing a purified nigrosine dye comprising:
(a) mixing a crude nigrosine dye selected from the group consisting of C.I. Solvent Black 5 and C.I. Solvent Black 7 with an organic solvent in which said nigrosine dye is insoluble, selected from the group consisting of benzene, toluene, xylene, chlorotoluene, o-dichlorobenzene, cresol, n-hexane, n-heptane, 2-methylpentane, n-octane, isooctane, n-nonane, n-decane, cyclohexane, methylcyclohexane, propanol, butanol, pentanol, amyl alcohol, ethylene glycol monomethyl ether, ethylene glycol monoethyl ether, propylene glycol monobutyl ether, methylethyl ketone, diethyl ketone, methyl isobutyl ketone, ethyl acetate, propyl acetate, butyl acetate, dioxane and a mixture thereof;
(b) extracting impurities soluble in said organic solvent from the crude nigrosine dye mixture; and
(c) recovering the purified nigrosine dye.

12. The process according to claim 4, wherein the organic solvent is selected from the group consisting of benzene, toluene, xylene, chlorotoluene, o-dichlorobenzene, cresol, n-hexane, n-heptane, 2-methylpentane, n-octane, isooctane, n-nonane, n-decane, cyclohexane, methylcyclohexane, propanol, butanol, pentanol, amyl alcohol, ethylene glycol monomethyl ether, ethylene glycol monoethyl ether, propylene glycol monobutyl ether, methylethyl ketone, diethyl ketone, methyl isobutyl ketone, ethyl acetate, propyl acetate, butyl acetate, dioxane and a mixture thereof.

13. The process according to claim 1, wherein the crude azine dye is selected from the group consisting of C. I. Solvent Black 5 and C. I. Solvent Black 7, and the organic solvent is selected from the group consisting of benzene, toluene, xylene, chlorotoluene, o-dichlorobenzene, cresol, n-hexane, n-heptane, 2-methylpentane, n-octane, isooctane, n-nonane, n-decane, cyclohexane, methylcyclohexane, propanol, butanol, pentanol, amyl alcohol, ethylene glycol monomethyl ether, ethylene glycol monoethyl ether, propylene glycol monobutyl ether, methylethyl ketone, diethyl ketone, methyl isobutyl ketone, ethyl acetate, propyl acetate, butyl acetate, dioxane and a mixture thereof.

14. The process of claim 11, wherein said solvent is methyl ethyl ketone.

15. The process of claim 11, wherein said solvent is o-dichlorobenzene.

16. The process of claim 11, wherein said solvent is cyclohexane.

17. The process of claim 11, wherein said nigrosine dye is C.I. Solvent Black 5.

18. The process of claim 11, wherein said nigrosine dye is C.I. Solvent Black 7.

19. The process of claim 11, wherein said solvent is isopropyl alcohol.

20. The process of claim 11, wherein said solvent is cellosolve.

21. The azine dye produced by any process according to claim 1, 2, 3, 4, 5, 6, 7, 8, 9, 10, 12 or 13.

* * * * *